(12) United States Patent
Thompson et al.

(10) Patent No.: US 10,692,204 B2
(45) Date of Patent: Jun. 23, 2020

(54) SYSTEM AND METHOD FOR HIGH SPEED SURFACE AND SUBSURFACE FOD AND DEFECT DETECTION

(71) Applicant: The Boeing Company, Chicago, IL (US)

(72) Inventors: Jeffrey G. Thompson, Auburn, WA (US); Morteza Safai, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 678 days.

(21) Appl. No.: 15/225,440

(22) Filed: Aug. 1, 2016

(65) Prior Publication Data

US 2018/0033136 A1    Feb. 1, 2018

(51) Int. Cl.
*G06T 7/00* (2017.01)
*G01J 5/08* (2006.01)
(Continued)

(52) U.S. Cl.
CPC ............ *G06T 7/0008* (2013.01); *B29C 70/38* (2013.01); *B29C 70/54* (2013.01); *G01J 5/0896* (2013.01);
(Continued)

(58) Field of Classification Search
CPC ........ A01N 25/00; A01N 37/42; A01N 37/44; A01N 39/04; A01N 43/12; A01N 45/00;
(Continued)

(56) References Cited

U.S. PATENT DOCUMENTS 3,774,014 A * 11/1973 Berler ................ G06K 7/10871
235/462.11
5,966,573 A    10/1999 Yu et al.
(Continued)

FOREIGN PATENT DOCUMENTS

EP    1391721 A2    2/2004
EP    1392721 A3    3/2004
(Continued)

OTHER PUBLICATIONS

Berend Denkena et al., "Thermographic online monitoring system for Automated Fiber Placement Processes," Composites, Part B, 2016, pp. 239-243, vol. 97, Elsevier Ltd.
(Continued)

*Primary Examiner* — Dave Czekaj
*Assistant Examiner* — Kehinde Abimbola
(74) *Attorney, Agent, or Firm* — Moore IP Law

(57) ABSTRACT

A system and method for the detection of foreign object debris materials or defects on and/or under a surface of a composite part under manufacture. A member, for example an inspection gantry, is configured to move over the surface. A thermal excitation source is fixed to the member and is configured to direct infrared radiation across the surface. An infrared camera is also fixed to the member a predetermined distance away from the thermal excitation source and is configured to scan the surface as the member moves over the surface to detect and output scan information of the surface. A controller is coupled to the excitation source and to the infrared camera. The controller is configured to process the scan information from the infrared camera to identify a foreign object debris material or defect located on and/or under the surface.

20 Claims, 5 Drawing Sheets

(51) Int. Cl.
| | |
|---|---|
| *G01N 25/72* | (2006.01) |
| *G06K 9/62* | (2006.01) |
| *H04N 5/225* | (2006.01) |
| *H04N 5/232* | (2006.01) |
| *H04N 5/33* | (2006.01) |
| *B29C 70/38* | (2006.01) |
| *B29C 70/54* | (2006.01) |
| *G06T 7/70* | (2017.01) |
| *G01J 5/00* | (2006.01) |

(52) U.S. Cl.
CPC .......... *G01N 25/72* (2013.01); *G06K 9/6267* (2013.01); *G06T 7/70* (2017.01); *H04N 5/2252* (2013.01); *H04N 5/23293* (2013.01); *H04N 5/33* (2013.01); *G01J 2005/0077* (2013.01)

(58) Field of Classification Search
CPC .............. G06T 7/0004; G06T 7/001; G06T 2207/30164; G06T 2207/10016; G06T 2207/10032; G06T 2207/10048; G06T 7/80; G06T 7/0008; G06T 7/70; B01L 2300/0829; B01L 3/5025; B01L 2200/12; B01L 2300/0636; B01L 2300/0887; B01L 3/5027; B01L 3/5085; B01L 2200/0647; B01L 2300/0681; B29C 70/38; B29C 70/54; G01N 25/72; G01N 21/94; G01J 2005/0077; G01J 5/0896; G06K 9/6267
See application file for complete search history.

(56) References Cited

U.S. PATENT DOCUMENTS

| | | | |
|---|---|---|---|
| 6,636,581 B2 * | 10/2003 | Sorenson | G01N 23/04 378/58 |
| 7,220,966 B2 | 5/2007 | Saito et al. | |
| 7,287,902 B2 | 10/2007 | Safai et al. | |
| 7,312,454 B2 | 12/2007 | Safai et al. | |
| 7,553,070 B2 | 6/2009 | Kollgaard et al. | |
| 8,167,482 B2 | 5/2012 | Hatcher | |
| 8,204,294 B2 | 6/2012 | Alloo et al. | |
| 8,289,372 B2 | 10/2012 | Hamrelius et al. | |
| 8,498,836 B2 | 7/2013 | Carlson | |
| 8,518,703 B1 * | 8/2013 | Wright | G01M 5/0033 116/200 |
| 8,529,846 B1 * | 9/2013 | Wright | G01M 5/0033 116/200 |
| 8,916,010 B2 | 12/2014 | Brennan et al. | |
| 8,934,007 B2 * | 1/2015 | Snead | G01L 1/24 348/125 |
| 8,986,482 B2 | 3/2015 | McCowin et al. | |
| 9,162,436 B2 | 10/2015 | Nelson et al. | |
| 9,207,188 B2 | 12/2015 | Terreno et al. | |
| 9,250,134 B2 | 2/2016 | Shepard et al. | |
| 9,606,070 B2 * | 3/2017 | Shelley, Jr. | G01N 21/94 |
| 9,839,946 B2 * | 12/2017 | Safai | B08B 5/02 |
| 2003/0043964 A1 * | 3/2003 | Sorenson | G01N 23/04 378/58 |
| 2003/0059103 A1 | 3/2003 | Shiomi et al. | |
| 2003/0219059 A1 | 11/2003 | Scott | |
| 2005/0117793 A1 | 6/2005 | Engelbart et al. | |
| 2005/0263702 A1 | 12/2005 | Agemura et al. | |
| 2006/0043303 A1 | 3/2006 | Safai et al. | |
| 2006/0191622 A1 * | 8/2006 | Ritter | G01N 25/72 156/64 |
| 2007/0257192 A1 | 11/2007 | Nishino et al. | |
| 2009/0076638 A1 | 3/2009 | Hu et al. | |
| 2009/0304916 A1 | 12/2009 | Nakajima et al. | |
| 2010/0163732 A1 | 7/2010 | Louban et al. | |
| 2010/0165095 A1 * | 7/2010 | Nakamura | G01N 21/3563 348/92 |
| 2010/0220186 A1 * | 9/2010 | Chan | G01N 21/9505 348/126 |
| 2011/0025838 A1 * | 2/2011 | Ninomiya | G01N 21/9501 348/87 |
| 2011/0268344 A1 * | 11/2011 | Chan | G01N 21/9505 382/145 |
| 2012/0085368 A1 | 4/2012 | Landry et al. | |
| 2012/0169497 A1 | 7/2012 | Schnittman et al. | |
| 2012/0205435 A1 | 8/2012 | Woerz et al. | |
| 2013/0061677 A1 | 3/2013 | Wang et al. | |
| 2013/0070083 A1 * | 3/2013 | Snead | G01L 1/24 348/125 |
| 2013/0269436 A1 | 10/2013 | Couse et al. | |
| 2015/0124237 A1 | 5/2015 | Zinn et al. | |
| 2015/0355118 A1 * | 12/2015 | Heissenstein | G01N 25/00 250/340 |
| 2016/0146741 A1 * | 5/2016 | Shelley, Jr. | G01N 21/94 356/237.3 |
| 2016/0209375 A1 | 7/2016 | Yamaoka | |
| 2016/0221048 A1 * | 8/2016 | Safai | B08B 5/02 |
| 2016/0299108 A1 | 10/2016 | Bisle et al. | |
| 2017/0027450 A1 | 2/2017 | Toledano et al. | |
| 2017/0160208 A1 * | 6/2017 | Shelley, Jr. | G01N 21/94 |
| 2018/0085792 A1 * | 3/2018 | Safai | B08B 5/02 |
| 2019/0133400 A1 | 5/2019 | Klintemyr et al. | |

FOREIGN PATENT DOCUMENTS

| | | |
|---|---|---|
| EP | 2759393 A2 | 7/2014 |
| EP | 2823954 A1 | 1/2015 |

OTHER PUBLICATIONS

European Extended Search Report for EP 17183230.6-1559, dated Nov. 2, 2017.
European Extended Search Report for EP 17183232.6-1559, dated Nov. 2, 2017.
Cuevas, Esmeralda et al., "Ultrasonic Techniques and Industrial Robots: Natural Evolution of Inspection Systems," 4th International Symposium on NDT in Aerospace, Berlin, Germany, 2012, 12 pgs.
Hornfeck, Christoph, et al., "Comparative Study of State of the Art Nondestructive Testing Methods with the Local Acoustic Resonance Spectroscopy to Detect Damages in GFRP," Journal of Nondestructive Evaluation, 34(2), 2015, 14 pgs.
Examination Report Pursuant to 94(3) for European Application No. 17183230.6 dated Mar. 22, 2019, 7 pgs.
Examination Report Pursuant to 94(3) for European Application No. 17183232.2, dated Mar. 22, 2019, 8 pgs.
European Communication pursuant to Article 94(3) EPC for application No. 17183230.6, dated Jan. 24, 2020, 5 pgs.
European Communication pursuant to Article 94(3) EPC for application No. 17183232.2, dated Jan. 24, 2020, 6 pgs.

* cited by examiner

SYSTEM AND METHOD FOR HIGH SPEED SURFACE AND SUBSURFACE FOD AND DEFECT DETECTION

FIELD

This disclosure relates generally to a system and method for high speed surface and subsurface foreign object debris and defect detection, and more particularly for a system and method for detecting surface and subsurface foreign object debris and defects during a composite layup process.

BACKGROUND

Composite materials are increasingly used as substitutes for conventional materials such as aluminum and steel alloys in various structural components due to the generally high strength-to-weight ratio inherent in composite materials. Composite materials may generally be comprised of a network of reinforcing fibers that are generally applied in layers, and a polymeric resin that substantially wets the reinforcing fibers to form an intimate contact between the resin and the reinforcing fibers. High speed composite layup machines are typically used to form each layer. Such machines can lay composite material at a rate of 3000 inches per minute.

A problem can arise, however, when foreign object debris (FOD), contamination or other type of tape layup anomaly is on or within the formed composite part prior to curing. For example, small amounts of entrapped or surface-adhering moisture or other types of contamination can result in delaminating and porosity of the composite material once the curing is completed. In addition, debris such as small pieces of bagging materials, Teflon tapes or breathing material used during the composite layup that becomes entrapped within a composite layer can result in delamination, porosity and wrinkles in the composite part. One particular type of FOD is referred to as a fuzzball and is generated during the manufacture of a composite part formed from layers of carbon fiber reinforced polymer (CFRP) tape. A so-called "fuzzball" consists of strands of CFRP tape that are abraded by contact with the spools holding the tape and which may randomly fall onto the surface of the composite part under manufacture. Further, other types of tape layup anomalies can occur during layup including twists, folds, untacked tows, wrinkles, bridging, etc. FOD and defect detection is currently done manually by visual inspection. Often, however, FODs and defects are either transparent or blend well with a surface color of the composite material and are thus difficult to detect visually. This manual FOD and defect detection method is thus slow and unreliable. Significantly, if the FOD materials and defects are not detected and removed or repaired prior to curing, large and expensive composite parts may be rejected during nondestructive testing.

One-piece composite parts are presently used in many applications, including parts for commercial aircraft. Such parts can be very expensive to manufacture, and very small FOD materials, contamination or defects not removed during the buildup phase of such a part can result in a manufacturing defect that requires the repair or even rejection of the part. The repair or rejection of such parts is thus quite costly and can also result in schedule delays and inventory problems.

Accordingly, there is a need for an automated high-speed inspection system for the detection of surface and subsurface FODs, contamination and defects during the high-speed composite layup process.

SUMMARY

In a first aspect, a system is disclosed for the detection of foreign object debris materials or defects on and/or under a surface. The system includes a member configured to move over a surface. The system also includes a thermal excitation source fixed to the member and configured to direct infrared radiation across the surface. The system further includes an infrared camera fixed to the member a predetermined distance away from the thermal excitation source. The infrared camera is configured to scan the surface as the member moves over the surface to detect and output scan information of the surface. Finally, the system includes a controller coupled to the excitation source and to the infrared camera. The controller is configured to process the scan information from the infrared camera to identify a foreign object debris material or defect located on and/or under the surface.

In one further embodiment, the system may include a terminal coupled to the controller. The terminal including a display. The controller may be further configured to provide an indication on the display upon the identification of foreign object debris material or a defect located on and/or under the surface.

In a second further embodiment, the surface may be an outer ply of a composite part being formed by a composite layup machine. The composite layup machine has a head mounted on a first gantry for moving over the composite part during formation thereof. The member is a second gantry which separately moves over the composite part during formation thereof. Further, the controller may be configured to detect defects including twists, folds, untacked tows, wrinkles or bridging in the composite part. Still further, the controller may be configured to provide real time measurement of laps and gaps between layers of composite material.

In a third further embodiment, the surface may be an outer ply of a composite part being formed by a composite layup machine. The composite layup machine having a head mounted on a first gantry for moving over the composite part during formation thereof. The member may correspond to the first gantry. Further, the infrared camera may be a radiometric infrared camera. Still further, the controller may be configured to provide upper layer and subsurface temperature information of the composite part based on scan information output by the radiometric infrared camera. Yet further, the controller may be configured to detect defects including twists, folds, untacked tows, wrinkles or bridging in the composite part. Finally, the controller may be configured to provide real time measurement of laps and gaps between layers of composite material.

In a fourth further embodiment, the surface is an outer ply of a composite part being formed by a composite layup machine using a carbon fiber reinforced polymer tape. The carbon fiber reinforced polymer tape contacts a spool causing the carbon fiber reinforced polymer tape to be abraded during operation to create carbon fiber reinforced polymer fuzzballs that randomly fall on the surface. The controller may be configured to process the scan information from the infrared camera to detect carbon fiber reinforced polymer fuzzballs on the part surface.

In a second aspect, a system is disclosed for the detection of foreign object debris materials or defects on and/or under a surface. The system includes a member fixed over a movable surface. The system also includes a thermal excitation source fixed to the member and configured to direct infrared radiation across the surface. The system further includes an infrared camera fixed to the member and configured to scan the surface as the surface moves under the member to detect and output scan information of the surface. The system finally includes a controller coupled to the excitation source and to the infrared camera. The controller is configured to process the scan information from the infrared camera to identify a foreign object debris material or defect located on and/or under the surface.

In one further embodiment, the system may include a terminal coupled to the controller, the terminal including a display. The controller may be further configured to provide an indication on the display upon the identification of foreign object debris material or defect located on and/or under the surface or a defect in the surface.

In another further embodiment, the surface is an outer ply of a composite part being formed by a composite layup machine. The composite layup machine has a head mounted on a gantry. The composite part moves under the gantry during formation of the composite part. The member corresponds to the gantry. Further, the infrared camera may be a radiometric infrared camera and the controller may be configured to provide upper layer and subsurface temperature information of the composite part based on the scan information output by the radiometric infrared camera.

In yet another further embodiment, the controller may be configured to detect defects including twists, folds, untacked tows, wrinkles or bridging in the composite part. Further, the controller may be configured to provide real time measurement of laps and gaps between layers of composite material.

In a still further embodiment, the surface is an outer ply of a composite part being formed by a composite layup machine using a carbon fiber reinforced polymer tape. The carbon fiber reinforced polymer tape contacts a spool causing the carbon fiber reinforced polymer tape to be abraded during operation to create carbon fiber reinforced polymer fuzzballs that randomly fall on the surface. The controller may be configured to process the scan information from the infrared camera to detect carbon fiber reinforced polymer fuzzballs on the surface.

In a third aspect, a method is disclosed for the detection of foreign object debris materials or defects on and/or under a surface of a workpiece. An infrared radiation beam from an infrared excitation source is moved over the surface of the workpiece. The surface of the workpiece is scanned with an infrared camera to detect and output scan information of the surface of the workpiece. The scan information from the infrared camera is processed to identify a foreign object debris material or defect located on and/or under the surface of the workpiece. In a further embodiment, the infrared camera is a radiometric camera and the scan information from the infrared camera is processed to provide temperature information for an upper layer of the workpiece and a subsurface of the workpiece.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

U.S. patent application Ser. No. 14/614,198 ("the '198 Application"), entitled "System and Method for High Speed FOD Detection," was filed on Feb. 4, 2015 and is assigned to the same assignee and includes the same inventors as this application. The '198 Application, which is incorporated by reference herein, describes a FOD detection system which employs a thermal (infrared) excitation source and an associated infrared camera. A controller coupled to the infrared camera is configured to detect FOD on the surface of a composite part under manufacture based on the difference in infrared emitted energy between the composite part and the FOD based on thresholding of a single line of the pixel array of the infrared camera (which is operated in line scan mode) as the thermal (infrared) excitation source and the associated infrared camera move over the surface of the composite part under manufacture.

FOD can also appear under the outer layer (ply) of the composite part under manufacture, but it can be difficult for the system disclosed in the '198 Application to identify this type of FOD (i.e., under layer FOD) and surface FOD because of the additional time required for the under layer FOD to absorb energy from the infrared excitation source (based on the thickness of the upper ply and the time necessary for the infrared energy to pass through the upper ply to the FOD thereunder). Because the infrared camera is mounted a fixed distance apart from the thermal (infrared) excitation source, the infrared camera may pass over the under layer FOD before the under layer FOD absorbs enough energy for the required amount of emitted energy for detection. As a result, the system disclosed herein employs an infrared camera that operates in the full two dimensional mode (not line scan mode) at the resolution of the particular camera (e.g., 1024×1024 pixels) and which includes a controller configured to analyze the information generated by the infrared camera to identify under layer and surface FOD (and other types of defects as discussed below) based on differences in thermal emitted energy between the under layer and some types of surface FOD and the composite part under manufacture. Other types of surface FOD may be identified based on reflected infrared energy.

Figure 1A:
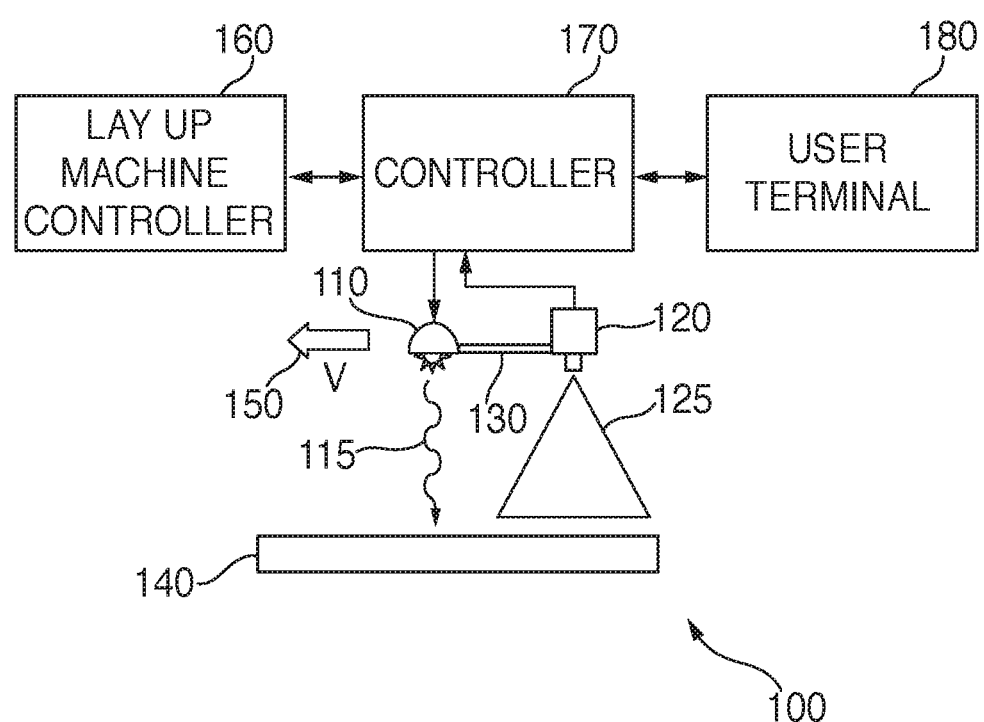
FIG. 1A is a block diagram of a FOD and defect detection system according to the present disclosure and FIG. 1B is a diagram showing FOD detection for surface and under layer FOD using the FOD and defect detection system of the present disclosure.
Figure 1B:
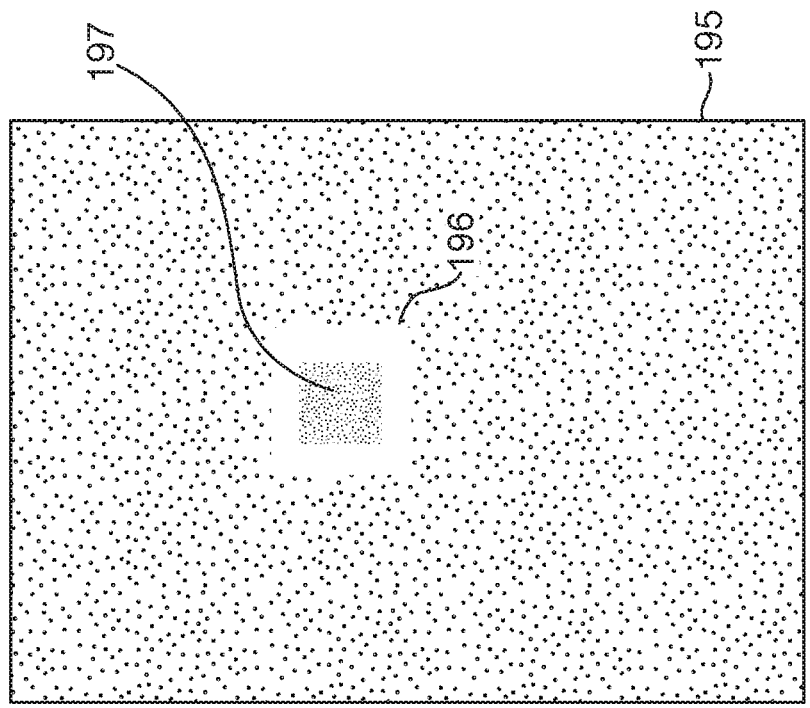
Figure 1B:
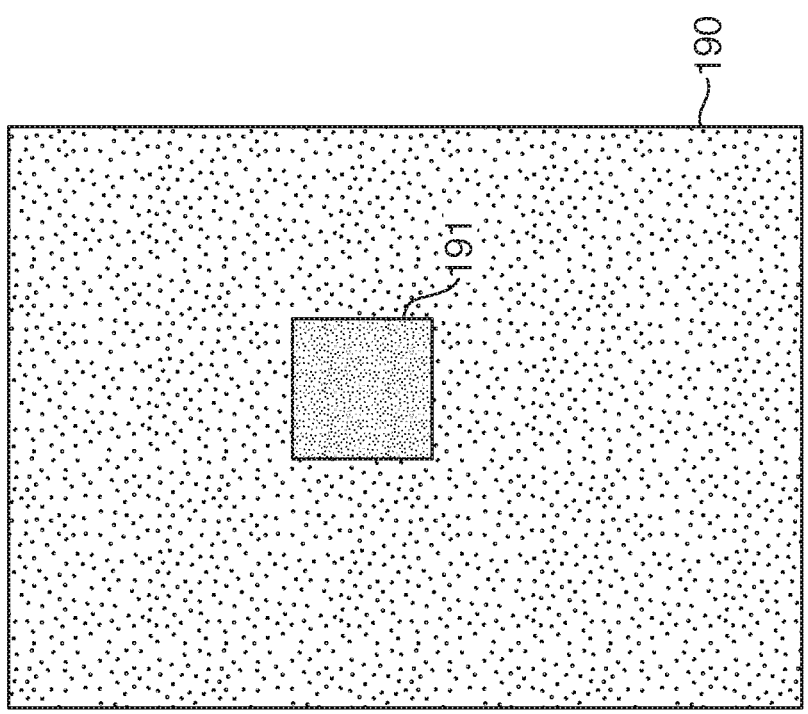

Referring now to FIG. 1, a system 100 is shown for detecting FOD on the surface of a composite part under manufacture and under, at least, the upper layer of that composite part. System 100 can also identify composite fuzzballs (a particular type of foreign object debris produced during composite part layup) and other types of tape layup anomalies that can occur during layup including twists, folds, untacked tows, wrinkles and bridging. System 100 includes a thermal (infrared) excitation source 110 and an associated infrared camera 120 mounted on a member 130 a fixed predetermined distance apart. Member 130 may be part of an overhead inspection gantry for a composite layup machine, for example. Thermal (infrared) excitation source 110 directs a beam of infrared energy 115 at a workpiece 140 (e.g., a composite part being manufactured). Thermal (infrared) excitation source 110 is mounted a fixed distance above workpiece 140, e.g., twenty feet. Infrared camera 120 scans workpiece 140 and outputs information based on the infrared energy output therefrom for analysis as member 130 is moved over workpiece 140 in a direction shown by arrow 150. Member 130 preferably moves at a fixed rate over workpiece 140. This rate may be as fast as 120 inches/second, and is typically between 50 and 100 inches per second. A controller 170 is coupled to activate thermal (infrared) excitation source 110 (e.g., when a scan of workpiece 140 commences, for example) and to receive the information generated by infrared camera 120. Controller 170 is also linked to a user terminal 180 (which may be a simple status display) and to the layup machine controller 160 to coordinate the operation of system 100 and the movement of member 130 with the operation of the layup machine.

In a further embodiment, infrared camera 120 may be a radiometric infrared camera and controller 170 may be configured to provide real time tape (upper layer) and substrate (inner surface) temperature while member 130 moves over workpiece 140 based on information proved by infrared camera 120.

In an alternative embodiment, member 130 is fixed in position and workpiece 140 is mounted on a movable platform which moves to allow infrared camera 120 to scan the entire length of workpiece 140 as workpiece 140 is moved below member 130.

Controller 170 is configured to analyze the information generated by infrared camera 120, and based on differences in thermal emitted energy levels, determine if any under layer and surface FOD or other defects exist. Once an under layer FOD, a surface FOD or other type of defect is found, a message can be provided via user terminal 180 regarding remediation efforts, which may include, for example, removal of surface FOD by hand, the notation of the position of under layer FOD or other defects for later repair, etc. For example, as shown in FIG. 1B, a composite part under manufacture 190 may include a surface FOD 191 that can be identified by the difference in infrared emitted energy between the composite part under manufacture 190 and the surface FOD 191. Similarly, a different composite part under manufacture 195 may include an under layer FOD 197 which may be identified by differences in emitted energy around the border of under layer FOD 197, shown by white area 196. Some other under layer FODs or under layer defects may be identified by having a completely different emitted energy characteristic (not just around the border thereof). Other information may also be derived by controller 170 based on the information from infrared camera 120, including real time measurement of laps and gaps between the laid tape.

Figure 2A:
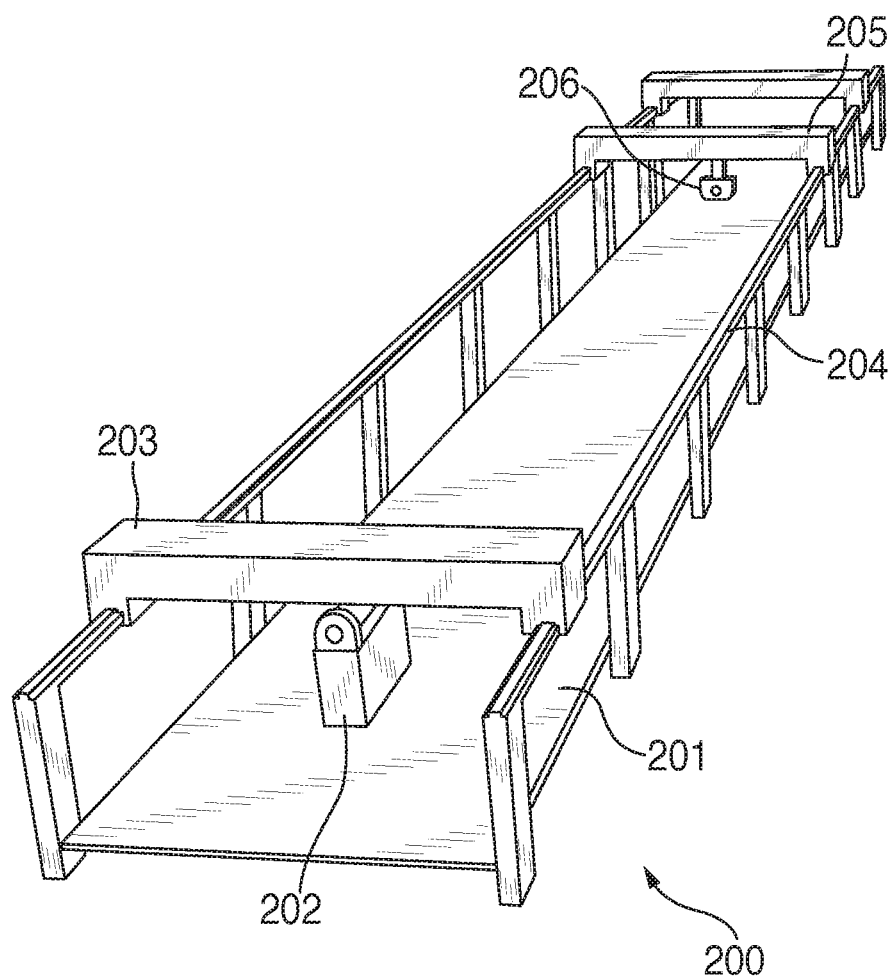
FIG. 2A is a diagram of a lamination cell for forming a carbon fiber wing skin including the FOD and defect detection system of FIG. 1 installed on an inspection gantry according to a first further embodiment the present disclosure.

Referring now to FIG. 2A, a lamination cell 200 for forming a composite part 201 (a workpiece) includes a layup head 202 mounted on a first movable gantry 203 (i.e., a member) that in turn is mounted on a support frame 204. Workpiece 201 includes a length and a width, and gantry 203 is mounted on support frame 204 via a mechanism that allows gantry 203 to move back and forth along the length of workpiece 201 to sequentially add layers of composite material, via layup head 202, to the workpiece during the process of forming the composite part being manufactured. Lamination cell 200 includes a second movable gantry 205 which is also mounted on support frame 204 via a mechanism that allows gantry 205 to move back and forth along the length of workpiece 201. An infrared camera 206 is mounted to gantry 205 along with an associated thermal (infrared) excitation source (not shown in FIG. 2A). Infrared camera 206 and the thermal (infrared) excitation source (not shown) in FIG. 2A correspond to infrared camera 120 and thermal (infrared) excitation source 110 shown in FIG. 1A and operate in an identical manner. In particular, a controller, not shown, is coupled to infrared camera 206 and the thermal (infrared) excitation source. This controller processes the information from infrared camera 206 to identify under layer and surface FOD or other defects in workpiece 201.

Figure 2B:
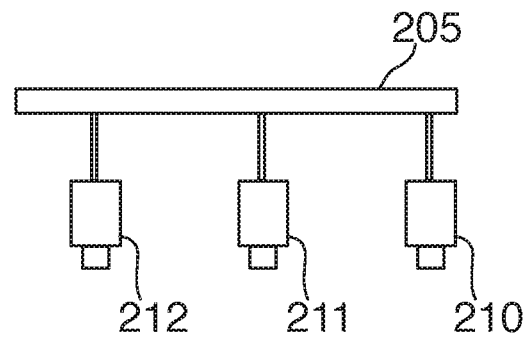
FIG. 2B is a front view of the inspection gantry of FIG. 2A.

Infrared camera 206 in FIG. 2A is mounted on member 205 (an inspection gantry) a fixed distance above workpiece 201, and, based on the particular field of view of infrared camera 206, is capable of examining a particular fixed area of workpiece 201 (the area having a length and width, the length parallel to the direction of movement of member 205). In some cases, the width of the workpiece 201 may be wider than the field of view of infrared camera 206. In such cases, multiple cameras and associated thermal (infrared) excitation sources for each camera may be mounted on the member that moves over the workpiece. For example, as shown in FIG. 2B, an inspection gantry 205 may include three infrared cameras 210, 211, 212 that, taken together, have a field of view wide enough to cover the entire width of the workpiece under examination (the width being perpendicular to the primary direction of movement of inspection gantry 205). The number of cameras employed depends on the width of the workpiece and the field of view of the cameras, and may range from a single camera (and associated thermal excitation source) to four or more cameras (each with an associated thermal excitation source).

Figure 2C:
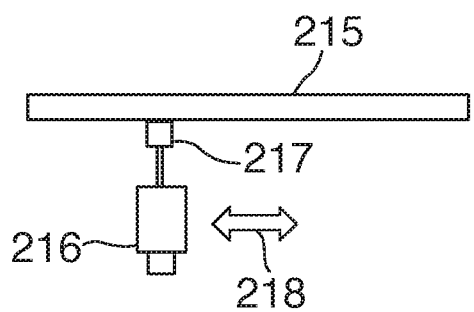
FIG. 2C is a front view of a first alternative inspection gantry.

Alternatively, as shown in FIG. 2C, a single infrared camera 216 may be used that moves laterally (shown by line 218) via a mechanism 217 along the inspection gantry 215 (the associated thermal (infrared) excitation source is not shown but also moves laterally along inspection gantry 215 in coordination with infrared camera 216). In this case, multiple passes can be made over the workpiece, each covering a longitudinal stripe of the workpiece, each stripe overlaying the previous and next stripe.

Figure 2D:
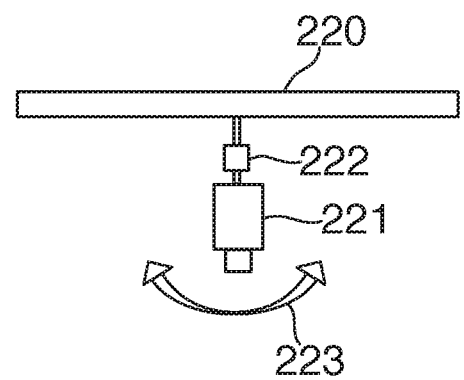
FIG. 2D is a front view of a second alternative inspection gantry.

Finally, as shown in FIG. 2D, a single infrared camera 221 may be used that is mounted to an inspection gantry 220 via a pivot 222 (to allow movement as shown by line 223). In this case, inspection gantry 220 is moved in a stepwise fashion during each lengthwise pass over the workpiece. A pause is inserted at each step to pivot camera 221 back and forth to ensure that the entire width of the workpiece is scanned by infrared camera 221.

Figure 3:
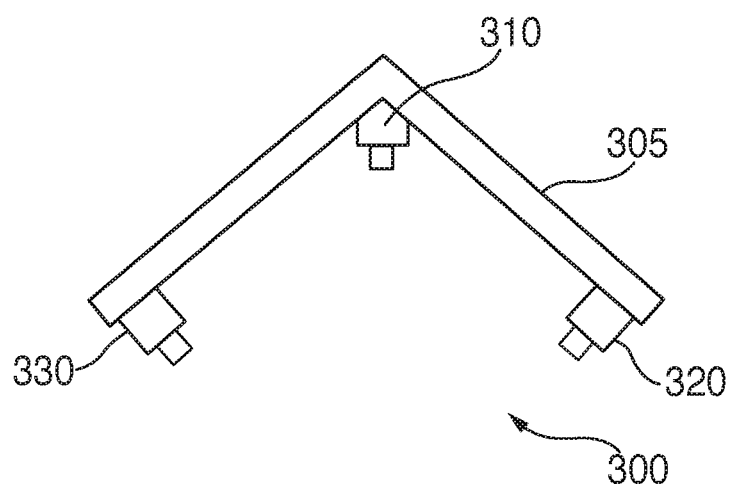
FIG. 3 is a diagram of the FOD and defect detection system of FIG. 1 installed on an inspection gantry for use in a lamination cell for forming a carbon fiber wing spar according to a second further embodiment of the present disclosure.

The system shown in FIG. 2A is effective at scanning a flat or nearly flat workpiece (e.g., a composite wing skin). However, there are many composite parts which are formed that have a surface that is not flat, for example a spar for an airplane wing, but instead includes a top flat portion and side portions orthogonal to the top flat portion. Referring now to FIG. 3, a system 300 for scanning a spar or other non-flat workpiece is shown. In particular, system 300 includes an angled inspection gantry 300 (which replaces the flat inspection gantry 205 shown in FIG. 2A). Three infrared cameras 310, 320, 330 are mounted to inspection gantry 300 (each with an associated thermal (infrared) excitation sources as in FIG. 1 which are not shown in FIG. 3). Infrared camera 310 is mounted at the apex of the angle of inspection gantry 305, and infrared cameras 320, 330 are each mounted at opposite ends of inspection gantry 305. In this manner, infrared camera 310 scans the top flat surface of the workpiece (e.g., spar), infrared camera 310 scans one of the surfaces orthogonal to the top flat surface of the workpiece and infrared camera 330 scans the other of the surfaces orthogonal to the top flat surface of the workpiece. System 300 allows a single pass to inspect a workpiece having a two-dimensional (non-flat) cross section. In some cases the cross-section of the workpiece may have side portions that are orthogonal to the top portion, e.g., in the case of a wing spar, and in other cases the workpiece may include side portions formed at an angle less than ninety degrees to the top portion. System 300 may be used to cover either situation, by adjusting the angle at which each camera 320, 330 is directed at the workpiece.

Figure 4:
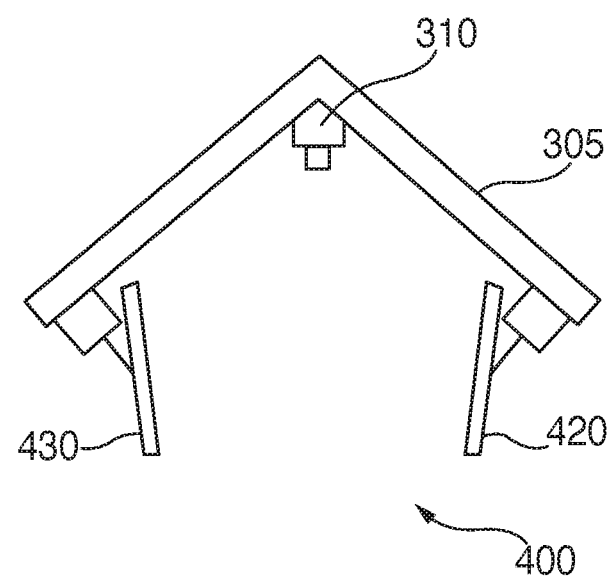
FIG. 4 is a diagram of the FOD and defect detection system of FIG. 1 installed on an inspection gantry for use in a lamination cell for forming a carbon fiber wing spar according to a third further embodiment of the present disclosure.

System 300 in FIG. 3 requires three cameras 310, 320, 330 to scan a non-flat workpiece in a single pass. Referring now to FIG. 4, a system 400 is shown which replaces cameras 320, 330 with infrared mirrors 420, 430. Camera 310 is positioned so that the field of view thereof includes mirrors 420, 430. The angles of mirrors 420, 430 are each adjusted so that the side portions of the non-flat workpiece are within the field of view of camera 310. In this way, system 400 provides significant costs savings over system 300 in FIG. 3 because the infrared mirrors 420, 430 are much less expensive than the two infrared cameras that mirrors 420, 430 have replaced. In a further embodiment, the infrared mirrors 420, 430 may be convex to allow a smaller area mirror to be used and still ensure that the entire portion of the side portions of the non-flat workpiece are within the field of view of camera 310.

In an alternative embodiment, system 100 shown in FIG. 1 may be installed on or adjacent to the tape layup head (e.g., layup head 202 on gantry 203 shown in FIG. 2A) to provide real time monitoring of uncured (green) tape to identify any splits or seams formed in the tape prior to adherence to the substrate. In particular, for lamination heads with low G-forces and adequate mounting space, an infrared camera may be positioned on or adjacent to the tape layup head to take advantage of the infrared heater installed on the lamination head to increase the temperature of the uncured (green) tape as it comes off of the tape creel prior to compaction with the compaction roller to ensure it is sufficiently tacky to adhere to the base substrate—i.e., the top level composite ply laid up in a prior pass of the tape layup head. In this embodiment, the infrared camera may be positioned just behind the compaction roller to monitor the energy emitted from the tape caused by the on-head heater. This embodiment eliminates the need for a separate thermal excitation source as in the prior embodiments.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for detection of foreign object debris materials or defects on or under a surface of a composite part, the system comprising:
   a support frame;
   a first gantry configured to move over the surface along an axis of the surface via the support frame, wherein the first gantry comprises a head configured to add layers to the composite part;
   a member comprising a second gantry, the second gantry configured to move over the surface along the axis via the support frame;
   a thermal excitation source fixed to the member and configured to direct infrared radiation across the surface, wherein the surface comprises an outer ply of the composite part being formed by the head, and wherein the composite part comprises multiple layers of composite material;
   an infrared camera fixed to the member a particular distance away from the thermal excitation source and configured to scan the surface as the member moves over the surface to detect and output scan information of the surface; and
   a controller coupled to the infrared camera, the controller configured to process the scan information from the infrared camera to identify a foreign object debris material or a defect located on or under the surface.

2. The system of claim 1, further comprising a terminal coupled to the controller, the terminal including a display, and wherein the controller is further configured to initiate an indication on the display upon identification of the foreign object debris material or the defect.

3. The system of claim 1, wherein the support frame comprises a first track, and wherein the first gantry and the second gantry are configured to move along the first track.

4. The system of claim 3, wherein the controller is configured to detect defects including twists, folds, untacked tows, wrinkles, or bridging in the composite part.

5. The system of claim 3, wherein the controller is configured to provide real time measurement of laps and gaps between layers of the composite part.

6. The system of claim 1, wherein the axis corresponds to a length of the composite part.

7. The system of claim 1, wherein the infrared camera comprises a radiometric infrared camera.

8. The system of claim 7, wherein the controller is configured to provide upper layer and subsurface temperature information of the composite part based on the scan information.

9. The system of claim 1, wherein the controller is configured to provide real time measurement of laps and gaps between layers of the composite part.

10. The system of claim 1, wherein the head is configured to form the composite part using a carbon fiber reinforced polymer tape, wherein the carbon fiber reinforced polymer tape contacts a spool causing the carbon fiber reinforced polymer tape to be abraded during operation to create carbon fiber reinforced polymer debris that falls on the surface, and wherein the controller is configured to process the scan information from the infrared camera to detect the carbon fiber reinforced polymer debris on the surface.

11. A non-transitory computer-readable storage device storing instructions that are executable by a processor to cause the processor to perform operations comprising:
- initiating movement of a first gantry over a surface of a composite part along an axis of the surface via a support frame, wherein the first gantry comprises a head configured to add layers to the composite part;
- initiating movement of an infrared radiation beam from an infrared excitation source over the surface via a second gantry configured to move over the surface along the axis via the support frame, wherein a member comprises the infrared excitation source and the second gantry, wherein the surface comprises an outer ply of the composite part, and wherein the composite part comprises multiple layers of composite material;
- in response to the infrared radiation beam, initiating scanning of the surface with an infrared camera to detect and output scan information of the surface, wherein the infrared camera and the infrared excitation source are fixed to the member; and
- processing the scan information from the infrared camera to identify a foreign object debris material or a defect located on or under the surface.

12. The non-transitory computer-readable storage device of claim 11, wherein the infrared camera comprises a radiometric infrared camera.

13. The non-transitory computer-readable storage device of claim 12, wherein the operations further comprise providing an upper layer and subsurface temperature information of the composite part based on information output by the radiometric infrared camera.

14. The non-transitory computer-readable storage device of claim 11, wherein the head is configured to form the composite part using a carbon fiber reinforced polymer tape, wherein the carbon fiber reinforced polymer tape contacts a spool causing the carbon fiber reinforced polymer tape to be abraded during operation to create carbon fiber reinforced polymer debris that falls on the surface, and wherein the operations further comprise processing the scan information from the infrared camera to detect the carbon fiber reinforced polymer debris on the surface.

15. A method for detection of foreign object debris materials or defects on or under a surface of a composite part, the method comprising:
- moving a first gantry over the surface along an axis of the surface via a support frame, wherein the first gantry comprises a head configured to add layers to the composite part;
- moving an infrared radiation beam from an infrared excitation source over the surface via a second gantry configured to move over the surface along the axis via the support frame, wherein a member comprises the infrared excitation source and the second gantry, wherein the surface comprises an outer ply of the composite part, and wherein the composite part comprises multiple layers of composite material;
- in response to the infrared radiation beam, scanning the surface with an infrared camera to detect and output scan information of the surface, wherein the infrared camera and the infrared excitation source are fixed to the member; and
- processing the scan information from the infrared camera to identify a foreign object debris material or a defect located on or under the surface.

16. The method of claim 15, wherein the infrared camera comprises a radiometric camera, and wherein the method further comprises:
- processing the scan information from the infrared camera to provide temperature information for an upper layer of the composite part and a subsurface of the composite part.

17. The system of claim 1, further comprising:
- a second infrared camera fixed to the member and configured to scan a second surface of the composite part as the member moves over the second surface to detect and output second scan information of the second surface; and
- a third infrared camera fixed to the member and configured to scan a third surface of the composite part as the member moves over the third surface to detect and output third scan information of the third surface.

18. The system of claim 1, wherein the member comprises a first portion and a second portion that is attached to the first portion at an angle to form an apex of the member, wherein the infrared camera is fixed to the apex of the member, and further comprising:
- a first infrared mirror fixed to a first end of the first portion; and
- a second infrared mirror fixed to a second end of the second portion.

19. The system of claim 18, wherein one or both of the first infrared mirror and the second infrared mirror have a convex shape.

20. The system of claim 18, wherein the composite part includes a first side portion and a second side portion that are outside a field of view of the infrared camera, wherein the first infrared mirror is configured to reflect a first infrared image of the first side portion to the infrared camera, and wherein the second infrared mirror is configured to reflect a second infrared image of the second side portion to the infrared camera.

* * * * *